US009084937B2

(12) United States Patent
Gadher et al.

(10) Patent No.: US 9,084,937 B2
(45) Date of Patent: *Jul. 21, 2015

(54) FAULTS AND PERFORMANCE ISSUE PREDICTION

(71) Applicant: GTECH CANADA ULC, Moncton, New Brunswick (CA)

(72) Inventors: Bharat Kumar Gadher, Dieppe (CA); Fayez Idris, Dieppe (CA)

(73) Assignee: GTECH CANADA ULC, Moncton, New Brunswick (CA)

(*) Notice: Subject to any disclaimer, the term of this patent is extended or adjusted under 35 U.S.C. 154(b) by 267 days.

This patent is subject to a terminal disclaimer.

(21) Appl. No.: 13/755,718

(22) Filed: Jan. 31, 2013

(65) Prior Publication Data

US 2013/0190095 A1 Jul. 25, 2013

Related U.S. Application Data

(63) Continuation-in-part of application No. 13/198,926, filed on Aug. 5, 2011, now Pat. No. 8,423,828, which is a continuation of application No. 12/273,159, filed on Nov. 18, 2008, now Pat. No. 8,028,196.

(51) Int. Cl.
*G06F 11/00* (2006.01)
*A63F 13/30* (2014.01)
(Continued)

(52) U.S. Cl.
CPC .............. *A63F 13/12* (2013.01); *G06F 11/008* (2013.01); *G06F 11/3466* (2013.01); *G06F 11/3636* (2013.01); *G06Q 10/20* (2013.01); *G06F 11/3447* (2013.01); *G06F 2201/86* (2013.01)

(58) Field of Classification Search
CPC .................................................... G06F 11/3636
USPC ........................................................... 714/26
See application file for complete search history.

(56) References Cited

U.S. PATENT DOCUMENTS 5,058,893 A * 10/1991 Dickinson et al. ........ 273/143 R
5,123,017 A * 6/1992 Simpkins et al. ............... 714/26
(Continued)

FOREIGN PATENT DOCUMENTS

WO        02/54654       1/2002
WO       02054654 A1     7/2002
WO       2005101271     10/2005

OTHER PUBLICATIONS

European Patent Application No. 09768258.7—Communication letter from European Patent Office dated Apr. 28, 2014.
(Continued)

*Primary Examiner* — Amine Riad
(74) *Attorney, Agent, or Firm* — Sullivan & Worcester LLP (57) ABSTRACT

Systems and methods for an online predictive diagnostic and prognostic maintenance system are disclosed. The systems and methods may be configured for use with networked gaming machines. The systems and methods may operate in real time and may detect and analyze data representing various indicators of machine performance or a current or future decrease in machine performance. The data may represent or be used to predict machine performance and risk of failure and to identify necessary or recommended repair, maintenance or other performance issues. In another embodiment systems and methods are disclosed for automated analysis of data regarding machine operation and generation of rules related to predicting the future performance, repair and maintenance needs of machines.

28 Claims, 8 Drawing Sheets

(51) Int. Cl.
*G06F 11/36* (2006.01)
*G06F 11/34* (2006.01)
*G06Q 10/00* (2012.01)

(56) References Cited

U.S. PATENT DOCUMENTS

| | | | |
|---|---|---|---|
| 5,581,694 A * | 12/1996 | Iverson et al. | 714/26 |
| 5,630,755 A * | 5/1997 | Walsh et al. | 700/91 |
| 6,003,651 A | 12/1999 | Waller et al. | |
| 6,115,654 A * | 9/2000 | Eid et al. | 701/29.8 |
| 6,574,754 B1 * | 6/2003 | Smith | 714/47.2 |
| 6,668,203 B1 | 12/2003 | Cook et al. | |
| 6,901,347 B1 | 5/2005 | Murray et al. | |
| 6,915,173 B2 * | 7/2005 | Chan et al. | 700/44 |
| 7,246,156 B2 | 7/2007 | Ginter et al. | |
| 7,496,798 B2 * | 2/2009 | Link et al. | 714/47.2 |
| 8,028,196 B2 | 9/2011 | Gadher | |
| 8,190,037 B2 | 5/2012 | Nakazato et al. | |
| 8,306,778 B2 * | 11/2012 | Leao et al. | 702/179 |
| 8,347,144 B2 * | 1/2013 | Khalak et al. | 714/26 |
| 8,352,216 B2 * | 1/2013 | Subbu et al. | 702/181 |
| 8,898,525 B2 * | 11/2014 | Loganathan et al. | 714/47.1 |
| 2004/0044499 A1 * | 3/2004 | House et al. | 702/181 |
| 2004/0064552 A1 | 4/2004 | Chong et al. | |
| 2004/0102928 A1 | 5/2004 | Cuddihy et al. | |
| 2004/0168108 A1 | 8/2004 | Chan et al. | |
| 2005/0066239 A1 | 3/2005 | Keeton et al. | |
| 2005/0210337 A1 * | 9/2005 | Chester et al. | 714/47 |
| 2006/0168475 A1 * | 7/2006 | Segers et al. | 714/25 |
| 2006/0294238 A1 | 12/2006 | Naik et al. | |
| 2007/0078962 A1 | 4/2007 | Donnelli et al. | |
| 2008/0294382 A1 * | 11/2008 | Lim et al. | 702/185 |
| 2009/0319827 A1 | 12/2009 | Nakazato et al. | |
| 2010/0093445 A1 * | 4/2010 | Mattice et al. | 463/46 |
| 2011/0106510 A1 * | 5/2011 | Poon | 703/2 |
| 2011/0276828 A1 * | 11/2011 | Tamaki et al. | 714/26 |
| 2012/0150334 A1 * | 6/2012 | Arbogast | 700/110 |
| 2012/0290879 A1 * | 11/2012 | Shibuya et al. | 714/26 |
| 2013/0204808 A1 * | 8/2013 | Jiang et al. | 706/12 |

OTHER PUBLICATIONS

International Search Report from corresponding PCT application, PCT/CA2013/000499 dated Sep. 19, 2013.

* cited by examiner

FAULTS AND PERFORMANCE ISSUE PREDICTION

PRIOR APPLICATION

This application is a continuation-in-part of pending U.S. patent application Ser. No. 13/198,926 filed Aug. 5, 2011, which is a continuation of U.S. patent application Ser. No. 12/273,159 filed Nov. 18, 2008, now U.S. Pat. No. 8,028,196, the entire disclosures of which are expressly incorporated herein by reference.

FIELD OF THE INVENTION

The disclosure relates to systems and methods for predicting failures or performance issues that may be configured for gaming machines and systems.

BACKGROUND

Maintenance operations on gaming devices are typically reactive, where repair occurs after a fault or problem has arisen. Typically, a gaming device is down and remains that way until the repair is accomplished. The gaming device is in either of two states; a "green" state where it is up-and-running, or a "red" state where it is down and awaiting repair. Note that the color representation is arbitrary and virtually any designation may be used. A problem is encountered, usually, by a player who informs a human operator at the retailer, e.g., a casino or lottery ticket agent. The operator may diagnose the problem and/or call a service technician, and notify the retailer and the central controller of the problem. The technician will usually call and discuss the problem with the operator so that the technician will bring relevant testing equipment and/or spare parts to fix the problem.

Such a service system is inefficient; it is time consuming and wasteful of time and money. The visiting technician may not have a full awareness of the problem and be unprepared when he arrives. Other lower priority problems may not be monitored, and even though they may be easily fixed, the technician may be unaware of the low priority problems. In this case, low priority problems may rise to a full failure requiring an emergency technician visit. For example, a low priority problem might be a bill acceptor operating acceptably but rejecting too many bills. If unattended, the bill acceptor may completely fail, shutting down the game device. If he were made aware of the problem with the bill acceptor, a visiting technician could service the bill acceptor and avoid the complete failure and down time for the game device.

Herein "problem" includes malfunctions and events (for instance something becoming jammed), predictive data or information and trend data. Trend data may include data that tracks information regarding lifetimes (or shorter time periods, which may or may not be predetermined) of modules in the game devices, or device components, parts, subassemblies or software or other such data that may suggest future problems. These alternative words may be used herein where syntax and usage suggest.

The technician, moreover, in many cases may not be needed, wherein his trip would be a total waste.

An automated maintenance (synonymous with service) system, that fully monitors gaming devices and automatically communicates and reports problems to retailers and central controllers that, in turn, schedules service technician visits would be advantageous.

SUMMARY

In one embodiment, new systems and methods for predictive diagnostic and prognostic maintenance systems are provided. In certain embodiments, the systems and methods may be configured for use with networked gaming machines. The systems and methods may operate in real time and may detect and analyze data representing various indicators of machine performance or a current or future decrease in machine performance. The data may represent or be used to identify necessary or recommended repair, maintenance or other performance issues.

In another embodiment, systems and methods are disclosed for automated analysis of data regarding machine operation and generation of rules related to predicting the future performance, repair and maintenance needs of machines. The systems and methods may automatically update existing rules related to machine performance, repair and maintenance predictions or needs.

In one embodiment, sensors on the machines and related software monitor, accumulate, store and share information for efficient maintenance and repair of gaming systems. Diagnostic and prognostic tests may be run and the results prioritized to identify and store data related to predictions or expectations of future problems or requirement for machine maintenance or repair. Individual machines may send event codes and sensed data corresponding to machine status, problematic issues, machine or system errors or other indicators related to the machines or their operation. The sensed data may be collected and stored in a database. The system may analyze the event codes and sensed data received during a time-window from a particular machine and diagnose the machine. The system may also examine the received data to provide prognosis of the machine's status over a defined time-horizon. In this way, the system may provide a prediction of future machine performance as well as future needs for machine repair, maintenance or upgrades.

In one embodiment the system is dynamic and adapts to changes in the expectations for future machine performance and future needs for machine or software repair, maintenance or upgrades, for instance based on analysis of machine or software performance data.

In another embodiment, methods and systems are provided to analyze historical or ongoing (real time) machine performance data (for instance, from a collection of machines) and determine a set of rules that may be used in an analysis of machine data to predict future machine performance and future needs for machine repair, maintenance or upgrades.

The system and methods may provide feedback or self reporting including data of machine operation and performance subsequent to machine repair, maintenance or upgrades and the data may collectively be used to enhance and adapt the rules used in analysis of machine data to predict future machine performance and future needs for machine repair, maintenance or upgrades. The result is systems and methods that increase the availability of gaming machines, increases the mean time between machine failures and decreases the instances of machine down time.

In another embodiment, systems and methods are provided that address many maintenance limitations of previously known systems and procedures by fully integrating each game device with sensors that monitor and record game device problems or events while accumulating and logging other diagnostic and prognostic data. Events are prioritized and business decisions determine actions based on the priorities. Diagnostic and prognostic tests may be administered and events and trends accumulated and may be stored locally and later at a central controller.

In one embodiment, systems and methods are provided for geographical mapping that may be displayed on a GUI that assists service technicians. There may be thousands of game devices distributed within thousands of retail locations over a wide geographical area which may be displayed in this manner.

In one embodiment systems and methods are provided that include a third state that indicates a "minor" problem that will (or is predicted to) later lead to a down state for a gaming device, for instance, if left unaddressed. The minor problem may be some intermittent operation or a parameter, for instance a temperature increase that is not found in typical or otherwise properly operational game devices. The intermittent operation may be due to operator or game player abuse or neglect, unusual environments, like high humidity or dust, normal wear or other malfunction or breakage. In one embodiment, an "amber" state along with the "red" and "green" states may be provided. Again, the colors are representative. The visualization immediately informs the nearest technician, for instance via geographical mapping so that the technician can be fully prepared for servicing one or several sites in the immediate area. Disclosed methods and systems allow the nearest technician to be alerted, the site and nearby sites and maintenance status of each may be displayed, accurate locations and traveling directions may be displayed, and the methods may include the step of assigning priorities by location, type of faults or problems and maintenance status (for instance the risk of an actual device shutdown or complete malfunction), as well as financial aspects of the sites or machines Illustratively, VLTs (video lottery terminals) are commonly found game devices connected in LANs along with retailers (a retailer is a terminal that may act as a site or LAN controller). Often the retailer is connected to a central controller via the Internet or other WAN. In particular, low priority events and trend data are maintained in the LAN and sent to a central controller when some higher priority event is sent, or when the network traffic is low. VLTs may be networked with central controllers directly or via a peer to peer network.

Low priority and/or trend events may include, inter alia: higher than expected temperatures, printer paper getting low or jamming, a bill acceptor rejecting too many bills, button sticking, intermittent problems closing doors, or glitches on a display screen, etc. Low priority events would include those that do not disable the operation of a game device, but should be repaired at some time, for instance, because they negatively affect the operation of the game device or the game playing experience.

High priority events suggest or call for more immediate attention and/or repair. Such events might include any event that shuts down the game device, e.g., bill acceptor not working, a video display not working, the VLT not working, etc. These events can be reported via the retailer to the central controller immediately. In this way, the methods of disclosed herein may include the step of escalating the reporting of a predicted fault to game operators, field technicians and ticketing systems can operate to see that the game machine is serviced or repaired as quickly as possible.

As described below, data analysis, for instance, trending or clustering may be used for prognosis determinations. For instance, diagnostic and prognostic tests may be self administered locally within the LAN or by the VLTs themselves.

Illustratively, the central controller may coordinate and respond to reported problems in a comprehensive manner. For example, a high priority problem arises and is reported to the central controller, via the retailer, which may send the lower priority, trend and diagnostic data along with the high priority event. The central controller may send low priority data regarding all the game devices at a site. If a service technician visit is necessary, the central controller may automatically inform the service technician about high and all the low priority issues at that site. The central controller may also automatically inform the service technician about low priority issues at other sites that will be on his geographic route to reach the site with the high priority problem.

Advantageously, whenever a service technician visits a retailer location, the technician may be forearmed with specific problems and/or symptoms related to all of the game devices at that site. The technician can arrive with all the tools, including diagnostic software, and replacement parts specific to the problems to be addressed. This significantly increases the maintenance system efficiency. A GUI may be available for a technician to enter test/diagnostic/prognostic programs. Illustratively, business rules may be applied that enhance the decision for types of responses to the problems. These rules may be amended to accommodate unforeseen problem that may arise.

In one embodiment, systems and methods are provided that will identify and record instances or symptoms that indicate a potential fault or failure. A predetermined time frame for servicing the device may be provided and a timely service visit may be scheduled.

One goal of certain failure prediction systems and methods contemplated herein is to improve system uptime and availability by predicting the occurrence of certain types of hardware and software errors, thereby increasing system and gaming machine mean time between failures. Certain machine faults are considered to be predictable before they occur by comparing machine events and sensor data to a set of rules. The set of rules may be dynamic and generated by an off-line process which examines the historical event codes and related data produced by different electronic gaming machines.

In one embodiment, a computer implemented method for generating a set of fault prediction rules is provided. The method may include the steps of operating one or a plurality of gaming devices and collecting event data from the gaming devices or from sensors associated with the gaming devices. Event data from the gaming devices is then analyzed with a computer processor and a set of one or more fault prediction rules may be generated with a computer processor, based on the event data analysis and patterns of gaming device operation and faults. The event data may include device malfunctions, device repair or service, or device operating parameters, such as temperature, performance test results, online accessibility; network availability (wireless or hard wired), sound operation, display operation, input device operation (for instance buttons or other controllers, or other software or hardware operational parameters.

As further described below, the method may also include steps to modify a set of one or more preexisting fault prediction rules based on the recently generated fault prediction rules or data analysis to form a new or updated fault prediction rule set.

In certain embodiments, the methods may include steps involving triggering diagnostic tests on a gaming device, for instance, in response to the event data analysis. Additionally, or alternatively, the method may involve predicting a likelihood of a device malfunction and then providing an alert to a gaming server.

In certain embodiments, the method may include the step of analyzing device event data over a time window, which time window may be predetermined, against the fault prediction rule set and predicting the likelihood of device malfunction or performance issue. The method may also include the step of receiving an indicator of a time window for the analysis, for instance from a game operator or central controller. In one embodiment, the time window is separately determined, for instance based on the analysis of aggregate or individual device event data.

The collected event data may be specific to a particular gaming site, for instance one casino or other geographic location or the event data may be specific to a particular gaming machine, device, or model of gaming device. In one embodiment, the event data represents at least one malfunction selected from the group consisting of mechanical, electrical and software malfunctions or errors. The event data may also represent machine status, certain problematic issues or machine errors.

In certain embodiments, the method may also include the steps of continuing to operate the one or more gaming devices during a period of continued operation and analyzing event data from the gaming devices during the period of continued operation. The method may also involve generating an additional set of fault prediction rules event data analysis with a computer processor based on patterns of gaming device operation and faults during the period of continued operation or based on a combination of device operation and faults during the period of continued operation and a time period preceding the period of continued operation. This method may then include the step of modifying the preexisting fault prediction rule set based on the additional set of prediction rules and forming a modified fault prediction rule set.

In another embodiment, a method is provided for predicting a performance issue with a gaming machine. This method may include the steps of monitoring a plurality of data elements representing operational characteristics of a gaming machine and then analyzing the plurality of data elements to determine whether the plurality of data elements are indicative of a risk of a performance issue with the gaming machine based on a set of rules for determining the risk of a performance issue. Subsequently a determination of whether or not the data elements are indicative of a risk of performance issue and responsive to a determination that one or more of the data elements are indicative of a risk of a performance issue with the gaming machine, a signal is transmitted to indicate the risk of a performance issue. The risk of a performance issue may be analyzed for a particular time period. Additionally, the method may include receiving an indication that the gaming machine has been serviced and recording servicing data related to the servicing of the gaming machine. This servicing data may be included in the plurality of data elements analyzed to determine whether the plurality of data elements are indicative of a risk of a performance issue with the gaming machine based on a set of rules for determining the risk of a performance issue.

In a similar embodiment, the method may include the steps of determining whether a gaming machine has been serviced, for instance based on event data related to the gaming machine and upon determining that the machine has been serviced, suppressing a signal indicating the risk of a performance issue.

In various embodiments, the step of analyzing the plurality of data elements may include filtering the data elements.

In accordance with certain embodiments, the methods may include outputting a communication for receipt by a field technician, a game machine operator or a malfunction ticket handling system, where the communication indicates a risk of a performance issue. Alternatively, or additionally, the methods may include a server assembling and communicating data elements representing risks of performance issues.

In another embodiment a system is provided to perform any of the methods described herein. For instance, a system may be provided to monitor and facilitate an analysis of data collected from a gaming machine that is used to determine a level of risk of a performance issue with the machine. The system may include a processor configured to collect data representing operational aspects of the gaming machine and transmit the collected data; a database configured to receive and store the collected data, where the database is operatively linked to the gaming machine; and a server operatively linked to the database, where the server is configured to analyze the collected data and to generate a risk factor for a performance issue with the gaming machine, the risk factor being based on an analysis of the collected data and a set of rules for determining the risk of a performance issue with the gaming machine. The servicer may also be configured to revise the set of rules for determining the risk of a performance issue with the gaming machine based on analysis of gaming machine performance data.

In another embodiment, a non-transitory computer readable medium having instructions stored therein thereon is provided. When executed, the instructions are operable to monitor and facilitate an analysis of data collected from a gaming machine and to determine a level of risk of a performance issue with the machine and to generate and a set of rules for determining the risk of a performance issue with the gaming machine based on analysis of gaming machine performance data.

BRIEF DESCRIPTION OF THE FIGURES

Certain embodiments of the invention are illustrated in the Figures of the accompanying drawings in which.

DETAILED DESCRIPTION

For simplicity and illustrative purposes, the principles of the present invention are described by referring mainly to various exemplary embodiments thereof. Although the preferred embodiments of the invention are particularly disclosed herein, one of ordinary skill in the art will readily recognize that the same principles are equally applicable to, and can be implemented in other systems, and that any such variation would be within such modifications that do not part from the true spirit and scope of the present invention. Before explaining the disclosed embodiments of the present invention in detail, it is to be understood that the invention is not limited in its application to the details of any particular arrangement shown, since the invention is capable of other embodiments. Throughout this description, certain acronyms and shorthand notations are used. These acronyms and shorthand notations are intended to assist in communicating the ideas expressed herein and are not intended to limit the scope of the present invention. Other terminology used herein is for the purpose of description and not of limitation.

Figure 1:
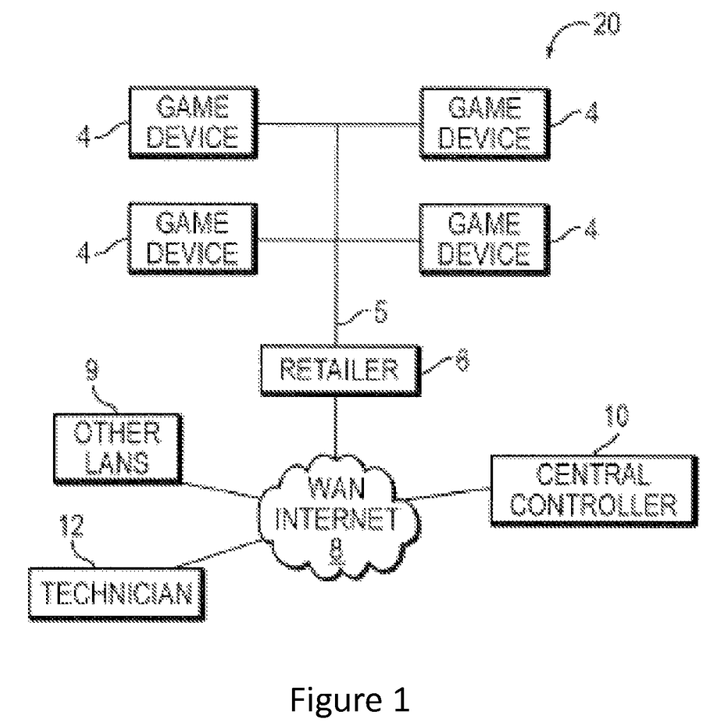
FIG. 1 is a schematic, block diagram of a network with client game devices, a retailer, and a central controller.

FIG. 1 is a schematic block diagram of a wide area computer network 2 that may include a plurality of game devices 4 communicating with a retailer 6 over a local area network 5 (LAN). The retailer communicates via the Internet 8 or other WAN to a central controller 10. A technician 12 may be contacted via the same communications network.

Game devices 4, retailers 6 and a central controller 10 may be in the form of computer servers or processors that may run one or more applications on one or more platforms (hardware and software) suitable for gaming applications.

Figure 2:
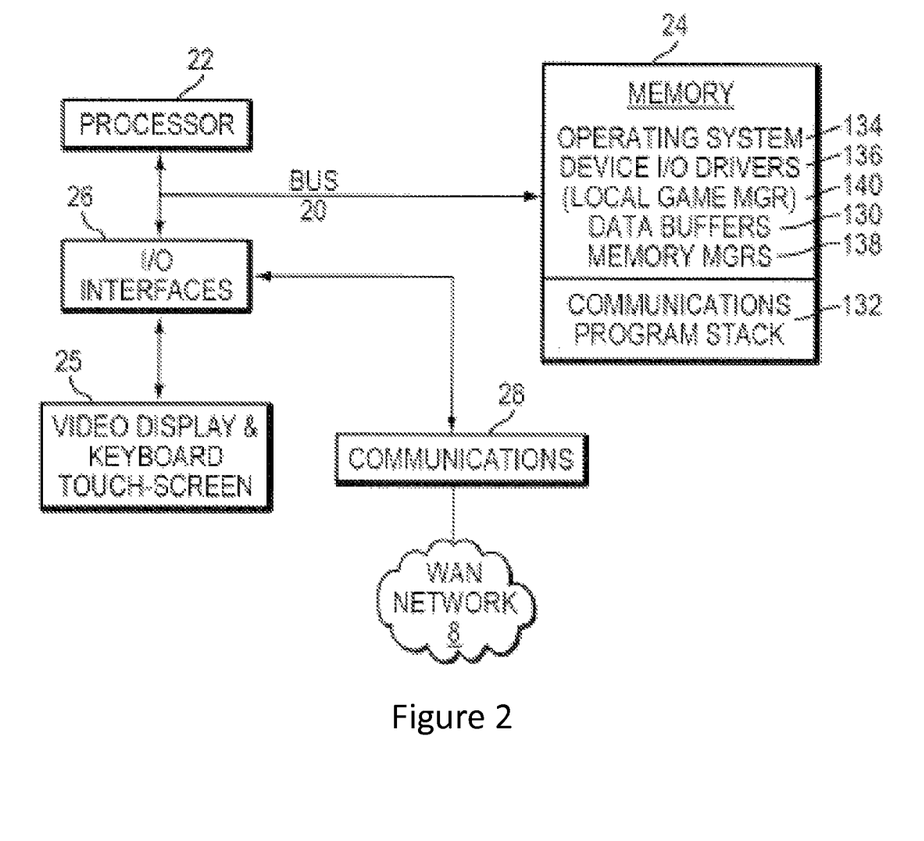
FIG. 2 is a schematic, block diagram of a typical game device, retailer, and central controller.

FIG. 2 is an illustrative block diagram of hardware and certain software modules that may be found in the game device 4, retailer 6, and central controller of FIG. 2. The central controller may have a more powerful implementation that performs many operations at high speeds, while the retailer may have more modest in hardware and processing speed, while the game device may have relatively modest hardware and software. Regardless, similar hardware may be found in each. A computer bus 20 connects a processor 22 to memory 24; to I/O (Input/Output) interfaces 26; and to communications hardware 28 that connects to the network 30 (here the NETWORK 30 may be the Internet 8 or the LAN).

The processor 22 may be any processor or controller or control logic arranged to execute program code and exercise control over the retailer or game device. Processors made by Intel, AMD, or any other manufacturer may be used, as well as ASIC. (Application Specific Integrated Circuit) or other particular designs. The memory 24 usually includes a ROM and a RAM. Again, standard hardware may be used, including electronic or magnetic ROM and RAM, flash, optical, CD's, hard disk drives, etc. External memory, not shown, may be used and include disk and RAID systems. The I/O interfaces 28 may include drives for motors. LED and other displays, printers, touch screens, mouse and keyboard or key, and other such interfaces.

The communications hardware 28 may include drivers for discrete wires, twisted pairs, Ethernets, Optical fiber, wireless and any other transmission types known to those skilled in the art.

A video display and touch screen keyboard 25 provides visual information for playing the game in a game device, controlling and monitoring the devices on an LAN for the retailer. Such a video display may operate as a graphical users interface (GUI).

In FIG. 2 the memory is shown having: a data storage 130 for local operations, a communications program stack 132 that implements the communications hierarchy; an operating system 134, device drivers 136, memory and other system managers 138 and local game control and operation software 140.

Figure 3:
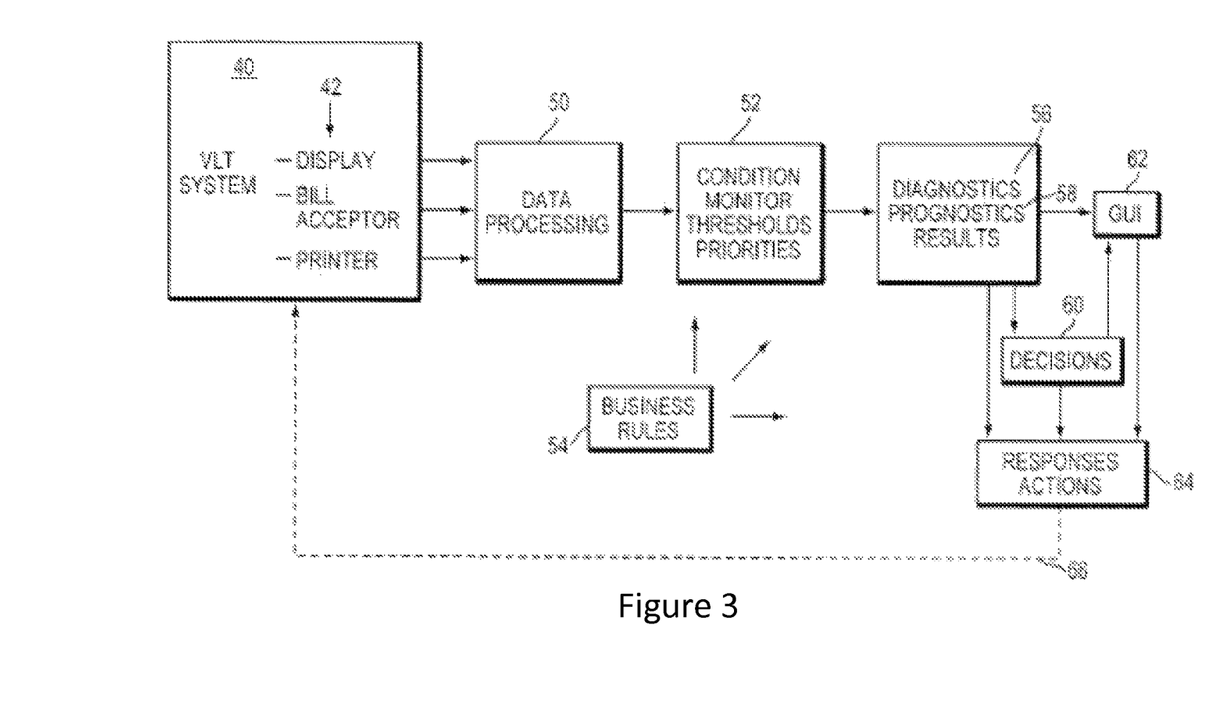
FIG. 3 is a flow chart of operations according one embodiment of the invention.

FIG. 3 is an illustrative flow chart showing functions reflecting a maintenance regimen in accordance with one embodiment of the invention. The functions may be resident in a VLT 40 and/or shared with the retailer or even the central controller (not shown). The VLT 40 detects and logs data associated with events that include issues or problems associated with access doors, bill (currency) acceptors, printers, coin mechanisms, button or touch sensors, the device game itself, power supplies, software and hardware errors, etc., for instance with a set of sensors. The data related to the events may include results from diagnostic and prognostic tests run on the game devices.

Illustratively in FIG. 3, the data acquisition 42 collects data on the video monitor 44, the printer 46 and the bill acceptor 48. The data from these input/output devices may be logged, tracked, processed 50 and tagged with a priority. A condition monitor 52 applies prior established thresholds (for instance developed heuristically or with historical data) and compares them to the data. Self generated diagnostics 56 or prognostic 58 initiated by the retailer, the central controller, the VLT itself or a technician may test many functions and operations of the VLT and tracks and stores the results.

Prognostic tests 58 may be run to identify parts of the VLT that are at risk of future failure. Prognostics tests may be scheduled to run at recurring times, for instance on a predetermined schedule or they may be performed on demand as required. Often the data from these tests warrant decisions 60 on how to proceed. The responses 64 to these decisions may include communication among or between the retailer, the VLT system itself, the central controller, and/or a technician. The graphical user interface (GUI) 62 is a convenient display where the data and decisions 60 may be visualized for review by a technician or other personnel. Visualizing a problem and an associated decision or provides feed back and control where a human may alter any reaction or response of the system.

In this embodiment, a set of business rules 54 are configured for facilitating responses to the data results for efficient maintenance of the gaming systems.

One benefit of this embodiment is that it preserves bandwidth to accommodate low bandwidth networks (dial-up, cellular, satellite, leased lines or wireless) and other systems that may be overloaded at peak traffic times. The low priority and informational data are buffered (stored) at the local game device or the retailer and sent to the central controller during low network traffic times. Informational data may include accounting information that is usually sent at the end of the business day.

A partial list of device events incorporated into an illustrative example of the present invention includes, for example: any access door open; the bill validator is: empty, miscounted, jammed, cheated, timed out, full, etc.; the printer is: offline, paper is low, no communications, paper jammed, cutter jammed, mechanism opened, misaligned, timed out (meaning some function had a time limit that expired), etc.; the coin mechanism is: mal-functioned, jammed, empty, electronic signal in error, etc.; touch sensors not responding, cash out buffer full; terminal disabled by retailer or central controller; event buffer full; batteries are low, games not installed or enabled or operating; a general system error; the system experienced a power down event; outdated versions of software or device drivers. When diagnostics are exercised other conditions that may be buffered include cooling fan speed, internal temperatures, presence and use of Flash memory, etc.

In FIG. 3 business rules 54 may include the following: a game device and the retailer buffer events including low and informational events and once a day (or weekly or biweekly or monthly or twice a day), the retailer will send the buffered data to the central controller at low network traffic time; whereas high priority events may be sent by the retailer immediately to the central controller; an authorized system person may be able to initiate and view the results of a self test or diagnostic for a game device from the central controller, the retailer or the game device itself; the central controller may be able to interrogate the retailer or game device for bill acceptor status, memory status, temperature, battery status; the data from self tests and diagnostics may be buffered for reporting and trending analyses. Trending data may include identifying and tracking usage of peripherals, electronic components, sensors, etc.—virtually all components found in a game device or retailer and the estimated or mean time between failures may be determined and displayed.

Priority is shared by the game device, the retailer and the central controller. Priority is high when, for instance, business rules so determine. For example, high priority is assigned when a game device is not operating or is malfunctioning in a way that prevents wagering activity or game playing or the machine is otherwise prevented from generating income, or the same or a similar situation occurs for an entire site of several game devices, or an entire LAN, an entire site or an entire gaming system. For instance, in addition to the sensors on a game machine one or more sensors may be placed on the network to confirm that the game machines are operating, for instance by a game machine returning an appropriate response following receipt of a status check message at the game machine. The system is also configured to allow for prioritization so that some sites, some LANs, or some game devices are assigned higher priorities. For instance, those with greater commercial value may be assigned higher priority. Moreover, some geographic location may be more visible to the public than others or may be more important, for some reason, than others and so may be assigned higher priorities. The human owners of a gaming system or site may set their priorities as they see fit.

The business rules 54 may include buffered data mining where programs may process the buffered data to determine and identify key attributes of hardware and/or software failures that presage future failures. Predictive events may be visualized and maintenance steps taken or modified to minimize the effects of future failures. In this aspect, the business rules 54 may be amended and/or added to so as to efficiently implement maintenance procedures that minimize these future effects.

Accumulating data may include measuring and storing many different operating parameters and characteristics of game devices and LANs, etc. Trends in these parameters and characteristics may suggest preventative maintenance that pre-empts more costly future failure that might have occurred. Measuring and tracking power usage, down time, temperatures, time that a game device may be being played, or upcoming special usages or occasions may dictate that preventative maintenance. One other important parameter may be the amount of time and type of servicing a technician may have spent on a game device, or at a site or on an LAN or WAN. These and other similar data allow for analysis that provides predictions for service and repair, leading to an effective, efficient maintenance system.

In another embodiment, an Online Adaptive Diagnostics and Prognostics (OADP) system and methods are disclosed. In preferred embodiments, the OADP system and methods are designed for gaming machines. The individual gaming machines send event codes and sensed data corresponding to status and/or problematic issues on the machines. The event codes and sensed data may be stored in a database. The disclosed system examines the event codes and sensed data received during a time-window (for instance a predetermined or otherwise externally determined time frame) from a particular machine and diagnoses the machine. The system also examines the received data to predict the machine status over a time horizon or at a defined point in the future.

A feedback system or mechanism (which may consist entirely or partly of software) is used to enhance and adapt the generated set of rules. Accordingly, the set of rules may be dynamic and the system and methods increase the availability of gaming machines and increase the mean time between failures or other down time for the gaming machines. Overall repair and maintenance costs may also be reduced since certain costly repairs may be avoided.

Figure 4:
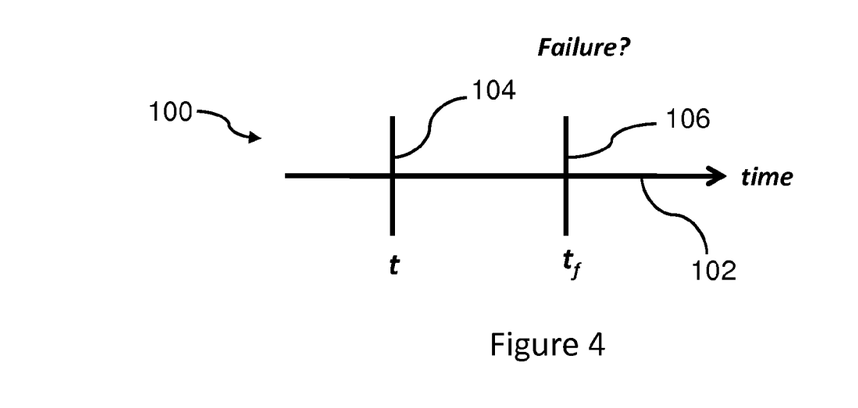
FIG. 4 is a timeline showing the relationship of certain events according to certain embodiments.

FIG. 4 is a timeline 100 showing the relationship of certain events in accordance with the methods and systems of the application. In the figure, horizontal line 102 shows increasing time. In this embodiment, a method of failure prediction may be summarized as follows. Given the current state of an electronic gaming machine at time t 104, we want to predict the potential occurrence of a failure at a future time, tf 106, as shown in FIG. 4. The current state of a machine at present time t 104, is represented by the set of events that occurred within a data window (time-window) preceding t 104. Potential occurrence of a failure within a prediction time window (time-horizon) can be predicted based on the event patterns and data that occur within the time window and may also include event patterns and data that precede the time window. Data mining techniques may be applied to identify and recognize patterns in the event data within the time window by analyzing a large set of event data. This allows for determination and identification of the events or data that commonly leads to machine failures within the time-horizon using data mining techniques.

Figure 5:
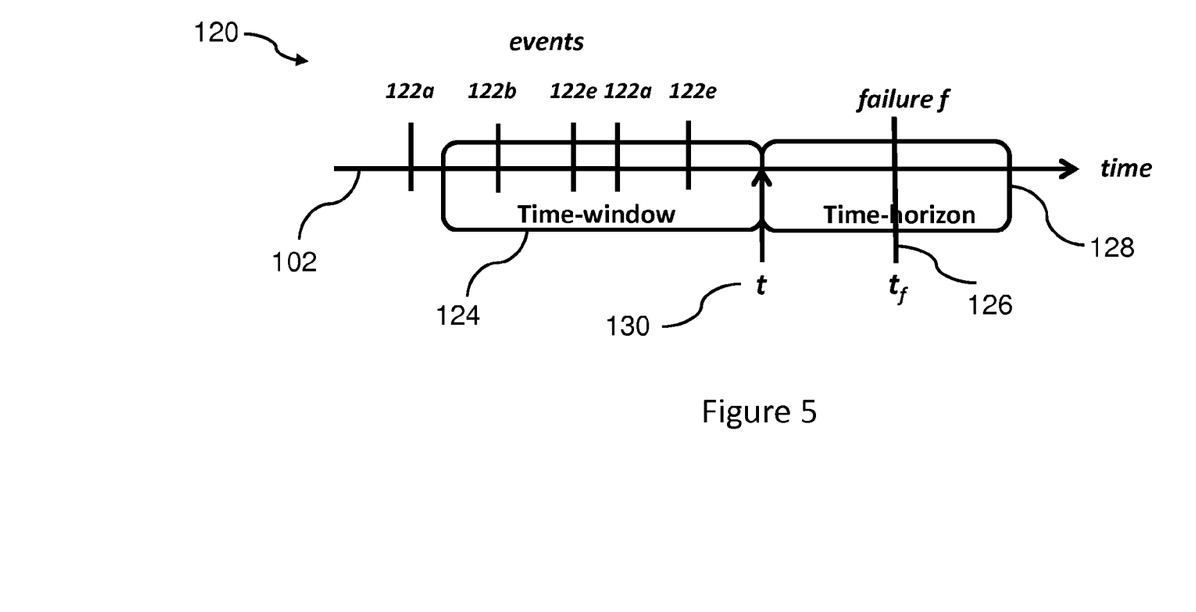
FIG. 5 is another timeline showing the relationship of certain events according to certain embodiments.

FIG. 5 is an exemplary timeline 120 depicting a series of events 122a, 122b and 122e that occur before a failure f 124, as shown in FIG. 5. As with FIG. 4, in FIG. 5, horizontal line 102 shows increasing time. Events 122a, 122b, and 122e occur in varying frequencies within a time window 124, leading up to a machine failure f 126 within a time horizon 128. In one embodiment, the systems and methods predict the likelihood or risk of a failure within the time horizon 128. In another embodiment, the systems and methods predict the likelihood or risk of a failure at a particular time point, such as time point t 130.

An exemplary method to identify the failure patterns includes analyzing a large or otherwise statistically significant set of historical event data, referred to as training data. In one embodiment, the training data includes a set of event data from electronic gaming machines that is sent to a central controller, though similar methods may rely on data from other machines. The central controller performs data analysis that results in the generation of a set of rules. The rule generation can be time consuming due to the large size of the training data; hence, it may run as an off-line process. Also this technique of generating rules based on a training data set may require customization for different deployment cases. For instance, the analysis may be required to address factors such as different types or models of gaming machines, the length of time that individual machines have been in the field, different models of peripherals in the gaming machines, different types of venues where the machines are installed and the maintenance or repair history of the different machines.

In one embodiment, the size of the training data may be determined by three factors: (i) the event data time window 124; (ii) the time horizon 128 for prediction; and (iii) the employed protocol. The time window 124 identifies and specifies the length and identity of the time block the training should consider and analyze when examining the historical data. The time horizon 128 specifies the prediction horizon, that is the length and identity of the time block in the future that the system should consider in determining predictions. Increasing the time horizon 128 may enhances the probability that a failure is predicted correctly, for instance, when a failure is predicted. On the other hand, if the time horizon 128 is too large, the prediction may be of limited use because it is not clear when the failure might occur. The employed protocol defines the event codes to be analyzed. The employed protocol directly affects the features used in training. Different protocols may have a different number and set of event codes. For example, one protocol may include as many as 400 different event codes, or even more.

In certain embodiment, the set of rules used for analysis is generated off-line in a process that is separate from live or ongoing game play or machine operation. The data set used to generate the rules may be fixed and unchanged throughout the data analysis steps. In other embodiments, the set of rules are generated online in an adaptive technique, for instance, during live game play or where the data set being analyzed is dynamic and updated, for instance with regular or irregular updates, which may occur on a monthly, weekly, daily, hourly or even more frequent basis. Certain advantages may be realized when generating the rules in an online or adaptive process.

One advantage of generating the rules online or with an adaptive process is that the data analysis may be less time and resource consuming. In the online or adaptive process the data is automatically collected from gaming machine sites, for instance, through the network. In an adaptive technique, a set of rules is already in place and the systems and methods operate to continue to monitor data from the gaming machines and update the existing rules. As a result, the amount of data analyzed to update a set of rules may be significantly less than amount of data necessary to create an initial set of rules from scratch.

Generating the training data may include the step of preprocessing the data, where software in the system may be configured to perform a preprocessing step, involving cleaning the collected data with a preprocessor. Cleaning the data may involve any one or more of the following subtasks: noise reduction or removal, identification and removal of outlying data entries, and resolving inconsistencies in the data. Cleaning may also refer to taking data in a raw or uncleaned state or form and converting the data into a form that is better suited for later data analysis steps, for instance, data mining or modeling tasks. For instance, cleaning may include processing or removal of extraneous or unnecessary data such as meta data, tags, or empty fields. Software in the system may also be configured to filter the collected data. In this context, filtering refers to a specific approach to feature extraction where redundancies (i.e., attributes carrying duplicate or less information) are eliminated by a function or ranking process. Other techniques for data manipulation may also be used or they may be used in the alternative, for instance wrapper, embedded and search based models of data management and manipulation. The preprocessing step may be performed separately, in sequence or in parallel, or together with other steps. Similarly, the software module or engine(s) that perform these steps may be provided separately or together, for instance filtering the data.

In an adaptive technique, the time for the preprocessing the data may be significantly reduced, since the total amount of data being processed may be significantly reduced, when compared against the amount of data that would need to be preprocessed in the absence of a preexisting set of rules.

Another advantage of adaptive or online techniques is that they may be configured to accommodate and responsively adjust to any mismatch arising when installing the prediction software at a new site. For instance, when first installed at a new site, there may be a mismatch between the training data set which was generated using historical data from another site and the gaming machines and data being produced at the new site. The adaptive techniques may be configured to avoid significant negative impact on the performance of the diagnostics and failure prediction or other issue prediction systems disclosed herein.

Another advantage of adaptive or online techniques is that they can accommodate new features and data codes in the data set being generated by the gaming machines. Advances in electronic gaming machines, advances and developments in gaming machine diagnostics, as well as the use of new protocols, may all result in new data codes for new events being generated. This new data may necessitate generating new rules as well as new decision trees to handle and make machine operation performance predictions based on this new data.

The adaptive or online techniques allow game operators to selectively include or exclude certain data codes for events from the decision process. The adaptive techniques operate in a flexible way to allow game operators this level of control and may even allow the system to generate new prediction rules or update existing rules based on a revised set of data codes or selected events.

The adaptive or online techniques facilitate handling heterogeneous event codes (e.g., event codes from sites which have different models of machines or different machines manufactured by different vendors).

In certain embodiments, the adaptive or online techniques may eliminate training steps. For instance in the case of a new installation of the performance prediction software system, a set of preexisting rules may be used as a starting point, and the adaptive system will then customize and update that set of rules to reflect the unique experience and history of that gaming site as time passes and gaming machine performance data is generated and even as the gaming site evolves with new gaming machines being added and older gaming machines being removed, or even changes in the population of different features and options appearing in the suite of gaming machines at the site.

Figure 6:
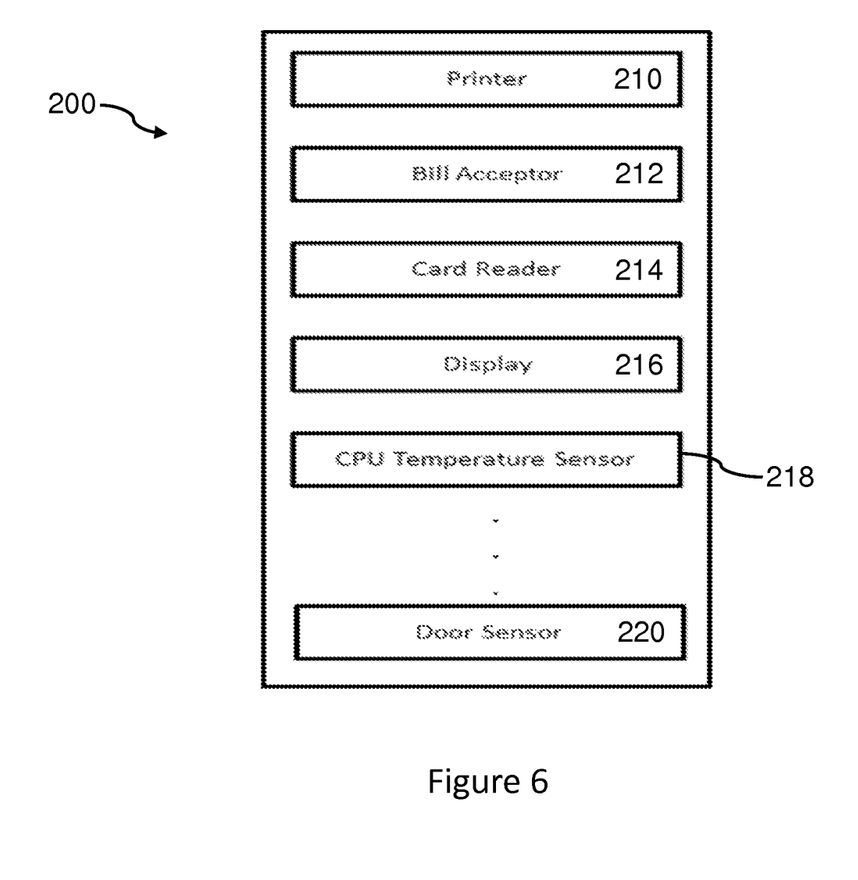
FIG. 6 depicts a block diagram showing certain components of an exemplary gaming machine.

FIG. 6 depicts a block diagram showing certain components of an exemplary gaming machine 200. The gaming machine 200 may include a printer 210, a bill acceptor 212, a card reader 214, a display 216, a CPU temperature sensor 218 and a door sensor 220. A gaming machine may be provided with various other sensors and components or it may also be provided with fewer sensors and components. In addition to the CPU temperature sensor 218, various other temperature sensors (not shown) may be provided, for instance to monitor the temperature of other components of the gaming machine or the temperature of the gaming machine generally. The door sensor 220 may be useful to indicate to a central controller whether the gaming machine door is closed or open, the latter position indicating a possible security breach.

Figure 7:
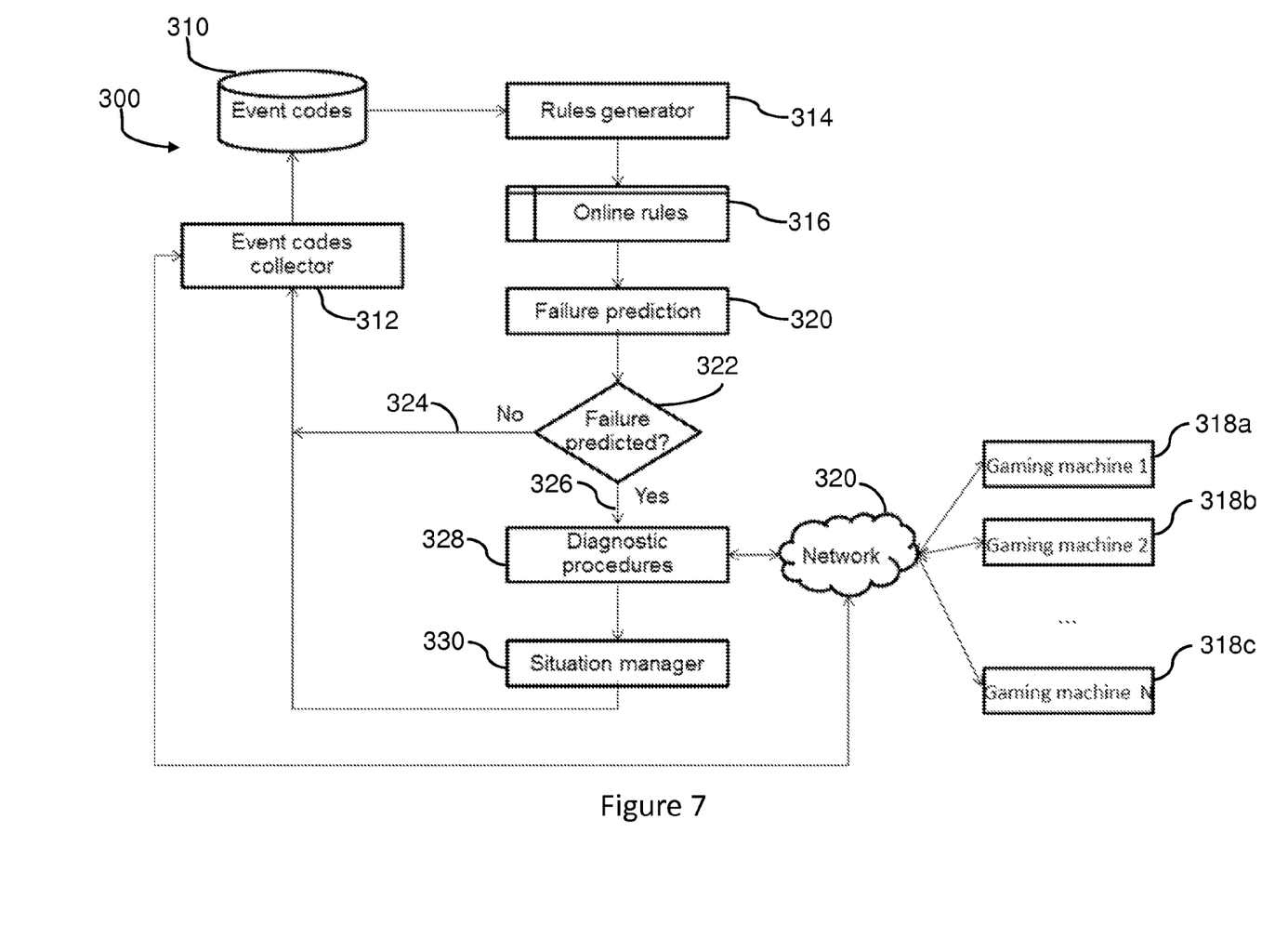
FIG. 7 depicts a flowchart illustrating an exemplary method of facilitating machine performance predictions.

FIG. 7 depicts a flowchart illustrating an exemplary method 300 of facilitating machine performance predictions in accordance with certain embodiments of the invention. In particular FIG. 7, a method of predicting potential failures for use with gaming machines. The method includes of two processes: a rule generation process and failure prediction process. The rules generation process is used to characterize the failure and non-failure patterns of the gaming machines using data from the gaming machines which is collected in the form of event codes 310. A software module or collection of software and hardware components, for instance sensors send data to an event codes collector 312. Further details related to the source and transmission of event code data to the event codes collector 312 is provided below.

The data representing the event codes may be stored in a database, and in some embodiments the event codes 310 may be the database. A rules generator 314 is in communication with the event codes database 310, as applicable, and may generate an initial set of rules using the existing event codes. Alternatively, the rules generator 314 may use a pre-generated set of rules as an initial online rules set 316. The rules generator 314 adapts the online rules set 316, for instance, in real time, depending on the observed event codes and the feedback information it receives through the event codes collector 312 related to the failure prediction.

The online rules set 316 contains the set of rules to predict failures or other events such as performance issues. Initially this could be a set of predefined set of rules that has been generated off-line. The online rules 316 may be represented as a set R={r1, r2, r3, . . . , rm}. Preferably the set of rules is dynamic and the number of elements in the set of rules R, |R|, may change depending on the collected event codes. The rules generator 314 may generate the online rules 316. Alternatively, or additionally, the rules generator 314 may also update an existing set of online rules 316, for instance based on ongoing analysis of the event codes database 310. A clustering technique, trend analysis, decision tree, or any other suitable data analysis algorithm or collection thereof may be employed for this purpose. For instance, in one embodiment the rule generator 314 may examine data leading up to a gaming machine failure to determine whether there might be identifiable trigger events, such as repeated occurrences of one or more event codes 310 or particular combinations of event codes 310 or instances of two or more event codes occurring within a particular time frame or instances of three or more event codes occurring within a particular time frame.

The event codes collector 312 collects events from the different gaming machines 318a, 318b, 318c and stores them into the event codes database 310, for instance upon receiving the events via the network 320. Events data may be used for predicting a failure 320 or predicting a different performance related event and may include firmware fault, optical fault, component fault, and memory fault, among others.

In step 322 of the method, a determination is made 322 as to whether a fault (or other performance event) is predicted for a given gaming machine, for instance, within a given time window or by a particular time point in the future. If the determination is that no fault (or other performance event) is predicted 324, then the method proceeds to continue to collect additional event codes with the event codes collector 312.

If step 322 results in a prediction of a fault (or other performance event) 326 then the method may proceed to perform diagnostics 328 on the gaming machine predicted to have a fault.

In one embodiment, the fault prediction step 332 operates as follows: for each gaming machine, the system analyzes the set of events that occurred during a defined time window and compares them against the online fault prediction rules 316. If a machine is expected to fail or experience a performance issue during the future time window, the system generates an alert message. The alert message may be sent to technician via e-mail, SMS, etc. Alternatively, the system might trigger a situation manager 330 to display an alert. Furthermore, the alert message may trigger the issuance of a maintenance ticket in a help desk system.

The failure prediction step 322 may include considering repair data related to components that have been repaired or serviced such that the system will not generate false alarms and request additional unnecessary repairs for such machines. This repair data may be maintained in a separate database (not shown) or it may be maintained within or as part of the event codes database 310. If a gaming machine has been serviced, repaired, or even replaced during the time window the failure prediction may be configured to suppress any alert generation for that particular machine.

The fault prediction alerts may be used to trigger diagnostic tests 328 to be performed by or on a gaming machine to verify failure predictions or performance predictions. The fault prediction engine with the adaptive method may also be applied in a root cause analysis, for instance, in an off-line mode, to analyze and predict faults in the repair shop of the operator.

The fault prediction analysis 322 may involve discovering which rule or rules match the current state of a gaming machine. The current state of a gaming machine may be represented by a collection of events codes and corresponding attributes. The fault prediction analysis 322 determines a match or best fit for known failures and the closest match for unknown failures. If R is the set of rules, in the online rules 316, where R={r1, r1, . . . , rm} and the current state of a gaming machine is Sj={e1$t$, e2$t$, . . . , ent} including the set of events and the corresponding attributes values collected at time t. A similarity analysis may be used to find the best rule that matches the current state Sj.

The situation manager 330 may provide feedback to the rules generator 314 thereby allowing a game machine operator to specify false alarms and ignore or prevent certain predictions. The feedback allows the rules generator 314 to take such information the next time it generates the online rules 316 and thereby adapt the rules to reduce false alarms and increase prediction accuracy. Over a period of time, for instance, multiple rounds of event code 310 analysis and rule generating the system 300 will optimize the online rules 316 for predicting relevant faults or performance issues. This may be achieved, for instance, through normalizing and developing a baseline for normal operation of a gaming machine and detecting any deviation towards a fault in the future based on any monitored event from the gaming machine.

Figure 8:
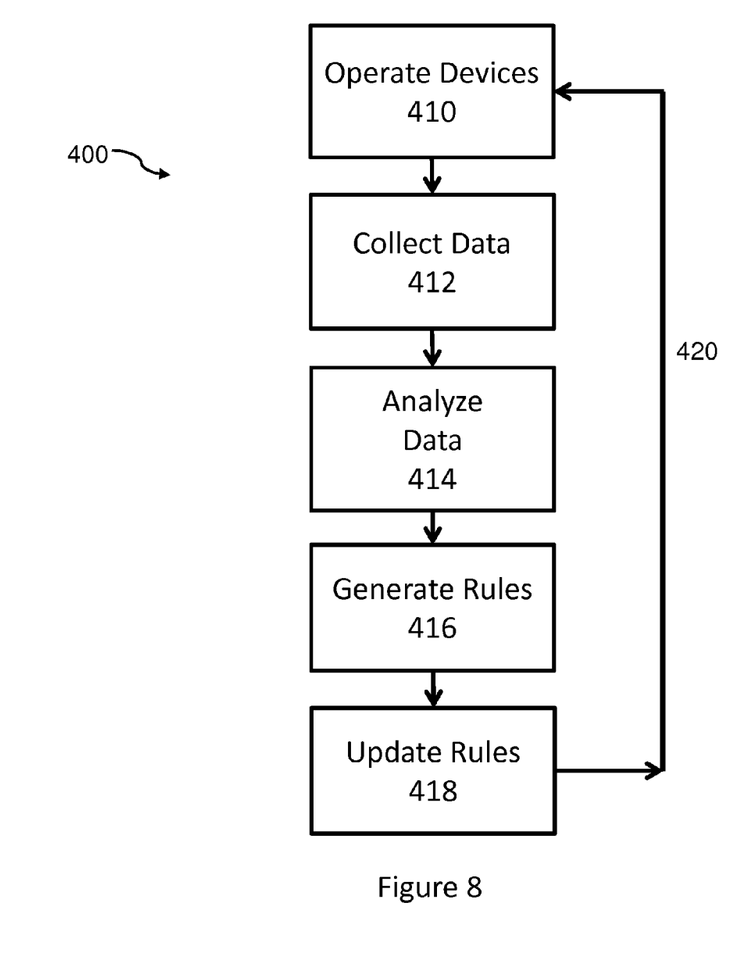
FIG. 8 depicts a flowchart illustrating another exemplary method of facilitating machine performance predictions.

FIG. 8 depicts a flowchart illustrating an embodiment of a method 400 for generating a set of fault prediction rules. In FIG. 8, the method includes the steps of operating one or a plurality of gaming devices 410 and collecting event data 412 from the gaming devices or from sensors associated with the gaming devices. Event data from the gaming devices is then analyzed 414 with a computer processor and a set of one or more fault prediction rules may be generated 416 with a computer processor, based on the event data analysis and patterns of gaming device operation and faults. The event data may include device malfunctions, device repair or service, or device operating parameters, such as temperature, performance test results, online accessibility; network availability (wireless or hard wired), sound operation, display operation, input device operation (for instance buttons or other controllers, or other software or hardware operational parameters. In a further optional step, the fault prediction rules are updated 418 and the method may then proceed back to the beginning 420, where the newly updated rules may be further updated based on additional data collected by the system.

Figure 9:
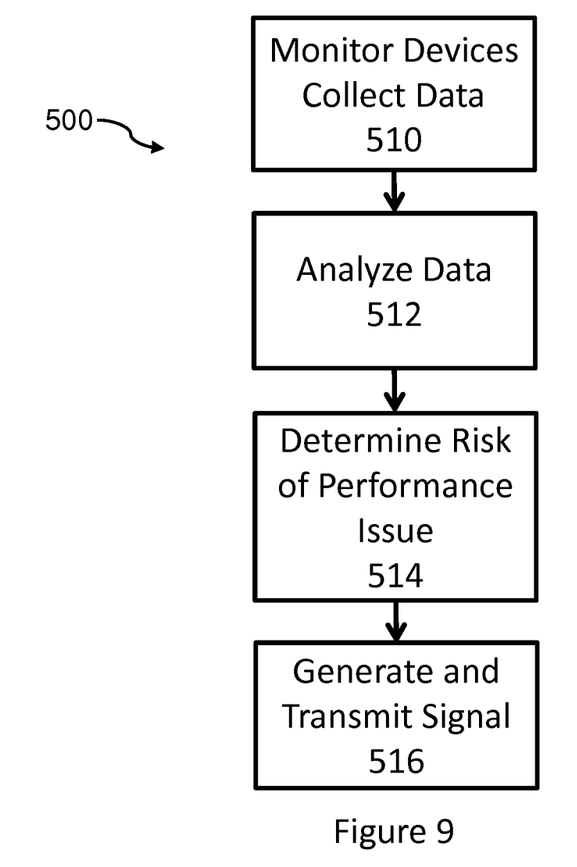
FIG. 9 depicts a flowchart illustrating another exemplary method of facilitating machine performance predictions.

FIG. 9 depicts a flowchart illustrating an embodiment of a method 500 for predicting a performance issue with a gaming machine. This method may include the steps of monitoring a plurality of devices 510 and data elements representing operational characteristics of a gaming machine, collecting the data and then analyzing the plurality of data elements 512 to determine whether the plurality of data elements are indicative of a risk of a performance issue with the gaming machine 514. As described herein this determination is based on a set of rules for determining the risk of a performance issue. Subsequent to a determination that the data elements are indicative of a risk of performance issue and responsive to a determination that one or more of the data elements are indicative of a risk of a performance issue with the gaming machine, a signal is transmitted 516 to indicate the risk of a performance issue. The risk of a performance issue may be analyzed for a particular time period.

Additionally, the method may include receiving an indication that the gaming machine has been serviced and recording servicing data related to the servicing of the gaming machine. The method may also include filtering any predicted faults to remove any false positives, for instance if a machine was newly deployed or had been recently serviced, or other known false positive result. The methods may also include prioritizing the determined performance issues based on a severity of the performance issue or an assessed risk of game machine malfunction; as well as escalating the reporting of the determined performance issues to game operators, service technicians or malfunction ticketing systems.

The methods may also include the steps of providing a report of the determined performance issues via a graphical user interface, for instance to a business intelligence unit for review by game operator executives, marketing personnel and other game operations persons or regulators.

The disclosed invention is applicable to both hardware and software failures and is applicable to gaming devices in online gaming, government sponsored and commercial gaming environments.

The above-described embodiments of the present invention can be implemented in any of numerous ways. For example, the embodiments may be implemented using hardware, software or a suitable combination thereof. When implemented in software, the software code can be executed on any suitable processor or collection of processors, whether provided in a single computer or distributed among multiple computers. Such processors may be implemented as integrated circuits, with one or more processors in an integrated circuit component. Further, a processor may be implemented using circuitry in any suitable format.

It should be appreciated that a computer may be embodied in any of a number of forms, such as a rack-mounted computer, a desktop computer, a laptop computer, or a tablet computer. The disclosed systems and methods are not restricted to electronic gaming machines, they would also apply to any functionally equivalent devices that can be used for gaming purposes such as personal computers, laptops, tablets, personal digital assistants (PDAs), mobile devices, a Web TV, a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks. As used herein, the term "online" refers to such networked systems, including computers networked using, e.g., dedicated lines, telephone lines, cable or ISDN lines as well as wireless transmissions. Online systems include remote computers using, e.g., a local area network (LAN), a wide area network (WAN), the Internet, as well as various combinations of the foregoing. Suitable user devices may connect to a network for instance, any computing device that is capable of communicating over a network, such as a desktop, laptop or notebook computer, a mobile station or terminal, an entertainment appliance, a set-top box in communication with a display device, a wireless device such as a phone or smartphone, a game console, etc. The term "online gaming" refers to those systems and methods that make use of such a network to allow a game player to make use of and engage in gaming activity through networked, or online systems, both remote and local. For instance, "online gaming" includes gaming activity that is made available through a website on the Internet.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a tangible, non-transitory computer readable storage medium (or multiple computer readable storage media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other non-transitory, tangible computer-readable storage media) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above. As used herein, the term "non-transitory computer-readable storage medium" encompasses only a computer-readable medium that can be considered to be a manufacture (i.e., article of manufacture) or a machine and excludes transitory signals.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags, addresses or other mechanisms that establish relationship between data elements.

Various aspects of the present invention may be used alone, in combination, or in a variety of arrangements not specifically discussed in the embodiments described in the foregoing and the concepts described herein are therefore not limited in their application to the details and arrangement of components set forth in the foregoing description or illustrated in the drawings. For example, aspects described in one embodiment may be combined in any manner with aspects described in other embodiments.

Also, the invention may be embodied as a method, of which several examples have been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While the invention has been described with reference to certain exemplary embodiments thereof, those skilled in the art may make various modifications to the described embodiments of the invention without departing from the true spirit and scope of the invention. The terms and descriptions used herein are set forth by way of illustration only and not meant as limitations. In particular, although the present invention has been described by way of examples, a variety of devices would practice the inventive concepts described herein. Although the invention has been described and disclosed in various terms and certain embodiments, the scope of the invention is not intended to be, nor should it be deemed to be, limited thereby and such other modifications or embodiments as may be suggested by the teachings herein are particularly reserved, especially as they fall within the breadth and scope of the claims here appended. Those skilled in the art will recognize that these and other variations are possible within the spirit and scope of the invention as defined in the following claims and their equivalents.

What is claimed is:

1. A computer implemented method for generating a set of fault prediction rules comprising the steps of:
   operating one or more gaming devices;
   collecting event data from the one or more gaming devices or from sensors associated with the one or more gaming devices;
analyzing event data from the gaming devices with a computer processor;
   generating a set of one or more fault prediction rules from the event data analysis with a computer processor based on patterns of gaming device operation and faults.

2. The method of claim 1, further comprising the step of modifying a set of one or more preexisting fault prediction rules based on the recently generated fault prediction rules to form a new fault prediction rule set.

3. The method of claim 1, further comprising the step of analyzing device event data over a time window against the fault prediction rule set and predicting the likelihood of device malfunction.

4. The method of claim 1, wherein the event data comprises device malfunctions.

5. The method of claim 1, wherein the event data comprises device repair or service.

6. The method of claim 1, further comprising the step of triggering diagnostic tests on a gaming device responsive to the event data analysis.

7. The method of claim 3, further comprising the step of determining a time window for the device malfunction.

8. The method of claim 1, wherein the event data is specific to a particular gaming site.

9. The method of claim 1, wherein the event data is specific to a particular gaming device.

10. The method of claim 1, wherein the event data is specific to a particular model of gaming device.

11. The method of claim 1, wherein the event data represents at least one malfunction selected from the group consisting of mechanical, electrical and software malfunctions.

12. The method of claim 1, further comprising the step of, responsive to a prediction of a likelihood of device malfunction, providing an alert to a gaming server.

13. The method of claim 1, further comprising:
   continuing to operate the one or more gaming devices during a period of continued operation;
   analyzing event data from the gaming devices during the period of continued operation;
   generating a second set of fault prediction rules event data analysis with a computer processor based on patterns of gaming device operation and faults during the period of continued operation; and
   modifying any preexisting fault prediction rule set based on the second set of prediction rules and forming a modified fault prediction rule set.

14. The method of claim 1, wherein the event data is data corresponding to machine status, problematic issues, or machine errors.

15. A method of predicting a performance issue with a gaming machine, the method comprising:
   monitoring a plurality of data elements representing operational characteristics of a gaming machine;
   analyzing the plurality of data elements to determine whether the plurality of data elements are indicative of a risk of a performance issue with the gaming machine based on a set of rules for determining the risk of a performance issue;
   responsive to a determination that one or more of the data elements are indicative of a risk of a performance issue with the gaming machine, transmitting a signal to a server indicating the risk of a performance issue.

16. The method of claim 15, wherein the risk of a performance issue is determined for a particular time period.

17. The method of claim 15, further comprising the steps of:
   receiving an indication that the gaming machine has been serviced;
   recording servicing data related to the servicing of the gaming machine; and
   including the servicing data in the plurality of data elements to determine whether the plurality of data elements are indicative of a risk of a performance issue with the gaming machine based on a set of rules for determining the risk of a performance issue.

18. The method of claim 15, further comprising the steps of:
   determining whether the gaming machine has been serviced; and
suppressing the signal indicating the risk of a performance issue.

19. The method of claim 15, wherein the step of analyzing the plurality of data elements includes filtering the data elements.

20. The method of claim 15, further comprising the server outputting a communication for receipt by a field technician, a game machine operator or a malfunction ticket handling system, the communication indicating the risk of a performance issue.

21. The method of claim 15, further comprising the server assembling and communicating data elements representing risks of performance issues.

22. A system that monitors and facilitates an analysis of data collected from a gaming machine that is used to determine a level of risk of a performance issue with the machine comprising:
- a processor configured to collect data representing operational aspects of the gaming machine and transmit the collected data;
- a database configured to receive and store the collected data, the database being operatively linked to the gaming machine;
- a server operatively linked to the database, the server being configured to process the collected data and to generate a risk factor for a performance issue with the gaming machine, the risk factor being based on a set of rules for determining the risk of a performance issue with the gaming machine.

23. The system of claim 22, wherein the server is further configured to revise the set of rules for determining the risk of a performance issue with the gaming machine based on analysis of gaming machine performance data.

24. The system of claim 22, wherein the collected data comprises data corresponding to machine status, problematic issues, or machine errors.

25. The method of claim 3, wherein the time window is predetermined.

26. The method of claim 3, further comprising the step of receiving an indicator of a time window for the device malfunction.

27. The method of claim 15, further comprising at least one of the steps of:
- filtering the determined performance issues to remove any false positives;
- prioritizing the determined performance issues based on a severity of the performance issue or an assessed risk of game machine malfunction; and
- escalating the reporting of the determined performance issues to game operators, service technicians or malfunction ticketing systems.

28. The method of claim 15, further comprising the step of:
- providing a report of the determined performance issues via a graphical user interface.

* * * * *